United States Patent
Cho et al.

(10) Patent No.: US 7,987,871 B2
(45) Date of Patent: Aug. 2, 2011

(54) SWITCHING VALVE (75) Inventors: Ryosuke Cho, Tokyo (JP); Yoshihiro Ogawa, Tokyo (JP); Kohei Fukudome, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 952 days.

(21) Appl. No.: 11/919,080

(22) PCT Filed: Apr. 21, 2006

(86) PCT No.: PCT/JP2006/308419
§ 371 (c)(1),
(2), (4) Date: Oct. 23, 2007

(87) PCT Pub. No.: WO2006/118052
PCT Pub. Date: Nov. 9, 2006

(65) Prior Publication Data
US 2009/0038697 A1   Feb. 12, 2009

(30) Foreign Application Priority Data
Apr. 27, 2005   (JP) .................................. 2005-130202

(51) Int. Cl.
*F15B 13/044* (2006.01)
*F16K 39/00* (2006.01)
(52) U.S. Cl. ............... 137/625.65; 137/625.27; 251/282
(58) Field of Classification Search ............. 137/625.25, 137/625.27, 625.65; 251/282
See application file for complete search history.

(56) References Cited

U.S. PATENT DOCUMENTS

| | | | |
|---|---|---|---|
| 2,404,514 A * | 7/1946 | Mcclure ........................ | 137/625 |
| 3,396,751 A * | 8/1968 | Bender ..................... | 137/625.65 |
| 3,661,183 A | 5/1972 | Komaroff et al. | |
| 3,880,476 A * | 4/1975 | Belart et al. ............. | 137/625.65 |
| 4,074,700 A * | 2/1978 | Engle ........................ | 137/625.27 |
| 4,844,122 A | 7/1989 | Ichihashi | |
| 5,046,530 A * | 9/1991 | Gossner et al. .......... | 137/625.65 |

(Continued)

FOREIGN PATENT DOCUMENTS
CH            500414            5/1970
(Continued)

*Primary Examiner* — John Rivell
(74) *Attorney, Agent, or Firm* — Arent Fox, LLP (57) ABSTRACT

A selector valve, comprising a valve chamber having a first valve seat and a second valve seat facing the first valve seat, a first fluid passage communicating with a first valve port on the periphery of the first valve seat of the valve chamber to flow a first working fluid therein, a second fluid passage communicating with the valve chamber to flow the working fluid therefrom or therein, a third fluid passage communicating with a second valve port on the periphery of the second valve seat of the valve chamber to flow the working fluid therefrom, a valve element disposed in the valve chamber and alternately separating from and coming into contact with the first valve seat and the second valve seat, a stem part connected to the valve element, a guide hole movably guiding the valve stem, a storage chamber for a seal means installed around the guide hole, an auxiliary passage allowing the storage chamber to communicate with the first fluid passage, and a solenoid part connected to the stem part for operating a solenoid rod. A first pressure receiving area formed by the first valve seat and the valve element joined to each other to receive the pressure of the first working fluid is set approximately the same as the third pressure receiving area of the stem part receiving the first working fluid in the storage chamber.

10 Claims, 6 Drawing Sheets

U.S. PATENT DOCUMENTS

| | | | |
|---|---|---|---|
| 5,617,879 A | | 4/1997 | Kubala |
| 5,718,264 A | * | 2/1998 | Sturman .................. 137/625.65 |
| 5,836,230 A | * | 11/1998 | Sturman .................. 251/129.07 |
| 2003/0041909 A1 | | 3/2003 | Sato et al. |

FOREIGN PATENT DOCUMENTS

| | | |
|---|---|---|
| CN | 1407265 | 4/2003 |
| DE | 1934212 | 1/1972 |
| DE | 19600664 | 8/1996 |
| DE | 60201797 | 3/2005 |
| EP | 1288550 | 3/2003 |
| ES | 381442 | 7/1970 |
| FR | 1193775 | * 11/1959 |
| FR | 2050104 | 6/1970 |
| GB | 1320014 | 6/1973 |
| GB | 2298009 | 8/1996 |
| JP | S49-10371 | 3/1974 |
| JP | S57-67173 | 4/1982 |
| JP | 01-158282 | 6/1989 |
| JP | 08-247361 | 9/1996 |
| JP | 10-196797 | 7/1998 |
| JP | 10-332020 | 12/1998 |
| JP | 2003-074736 | 3/2003 |
| SE | 361082 | 1/1971 |
| TW | 539820 | 9/1991 |

* cited by examiner

SWITCHING VALVE

TECHNICAL FIELD

The present invention relates to a switching valve with an enhanced operational performance of the valve body. More particularly, it relates to a switching valve for making a direct opening/closing of the valve body by means of an operational force of a solenoid portion and for preventing pressure of the switched fluid from affecting the operational characteristics of the valve body.

BACKGROUND ART

Figure 4:
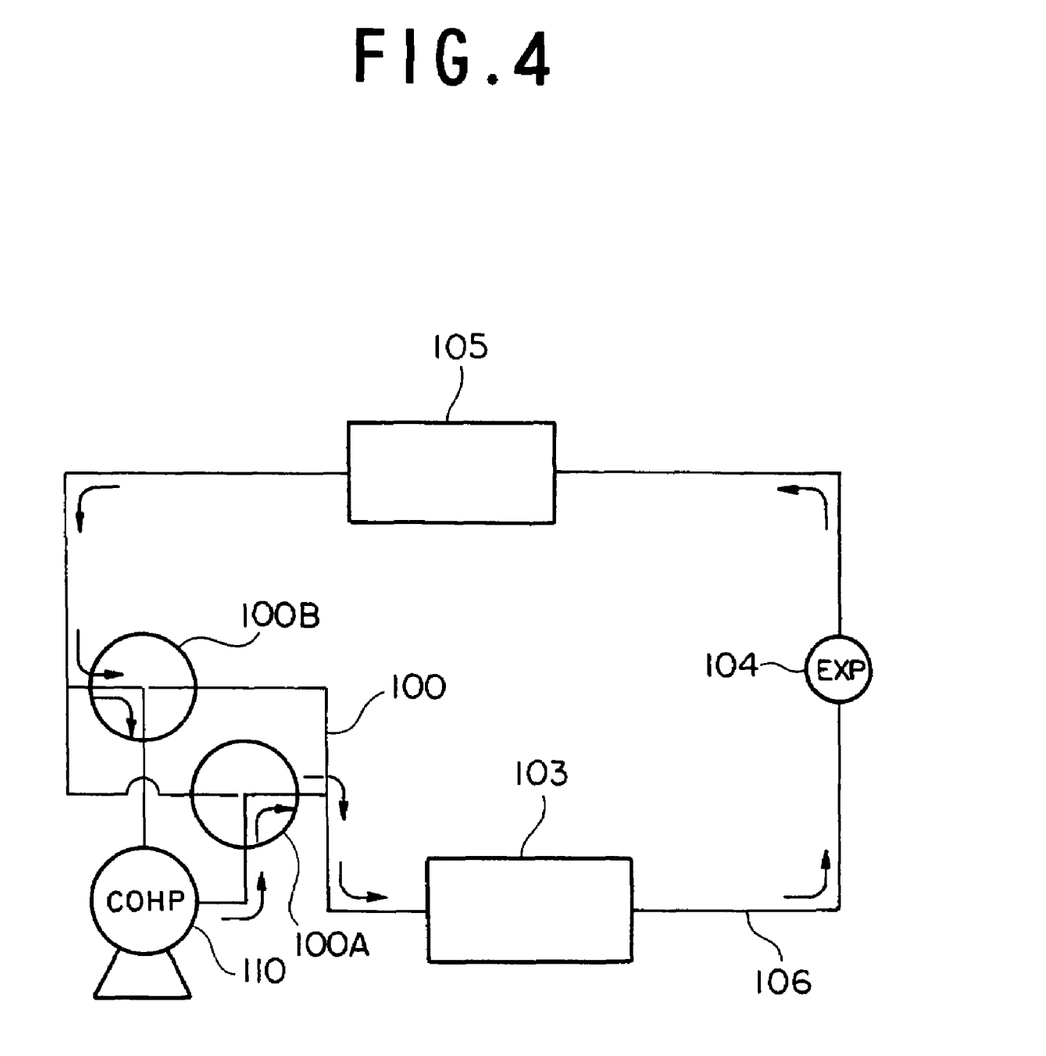
FIG. 4 is a piping layout of the refrigeration cycle installing a switching valve of the present invention or a conventional example.
Figure 5:
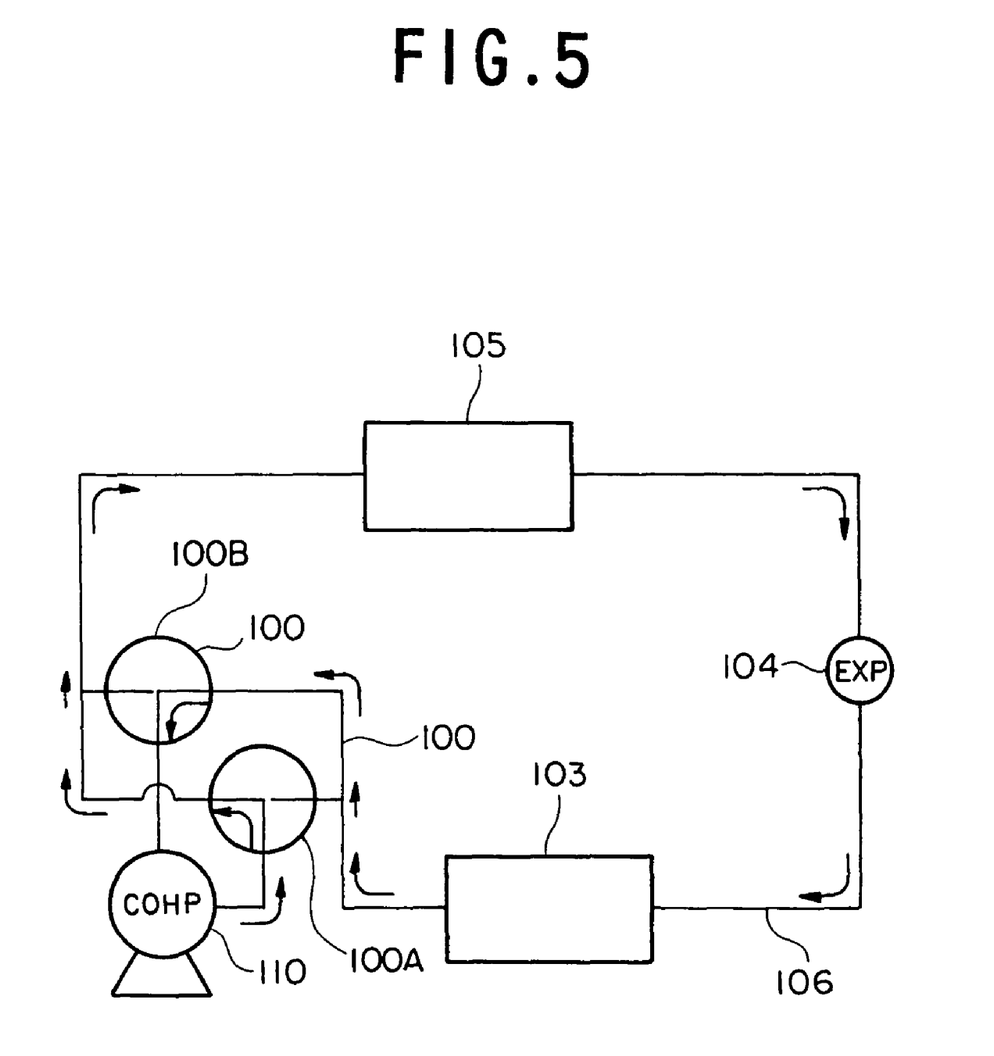
FIG. 5 is a piping layout of the heating cycle installing a switching valve of the present invention or a conventional example.
Figure 6:
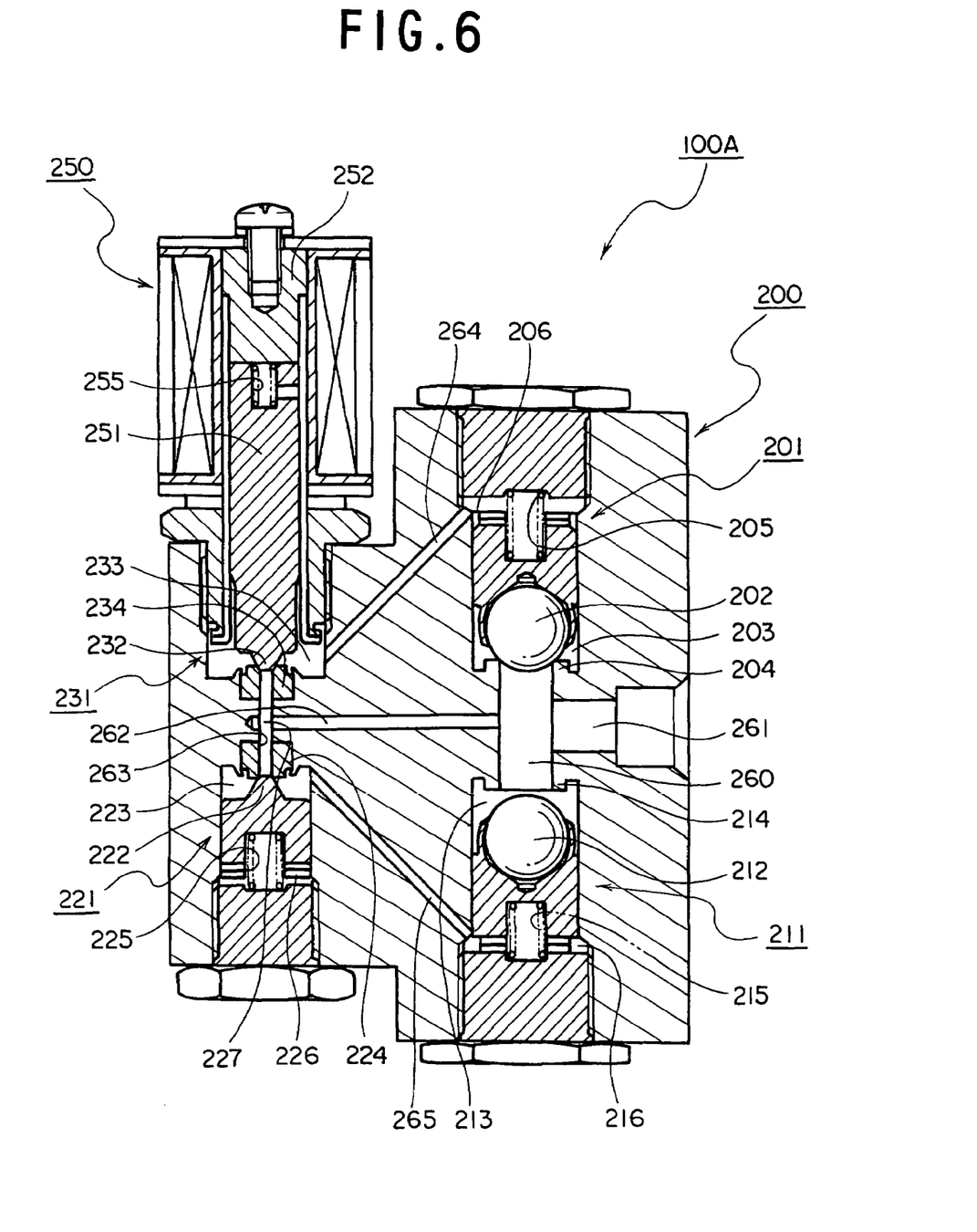
FIG. 6 is a full cross-sectional view of a switching valve as a prior art similar to the present invention.

There is a three-way or four-way valve used for piping of air conditioner and the like as prior art of the present invention (refer to the patent reference 1 given below). Inside the piping of the refrigeration cycle in the air conditioner an operational fluid such as $CO_2$ or the like is used as a refrigerant. In the refrigerant cycle using $CO_2$ as operating fluid, generally the service pressure range becomes more than ten times compared with those of conventional refrigerants. The fact that the service pressure is high causes various problems to a switching valve. FIG. 4 illustrates a refrigeration cycle of this air conditioner. Also FIG. 5 illustrates a heating cycle of the air conditioner. In addition, FIG. 6 shows a full cross-sectional view of a three-way valve used in the cycles of FIG. 4 and FIG. 5.

100 in FIG. 4 and FIG. 5 designates a valve apparatus being comprised of a first three-way valve 100A and a second three-way valve 100B. This valve apparatus 100 communicates with the piping from a compressor 110. One side of piping of the valve apparatus 100 communicates with an outdoor heat exchanger 103. Also the other side of piping of the valve apparatus 100 communicates with an indoor heat exchanger 105. In addition, there is disposed an expansion valve 104 in the piping 106 which communicates the outdoor heat exchanger 103 with the indoor heat exchanger 105.

Next, one of the three-way valve 100A used in the refrigeration and heating cycles will be described using FIG. 6. The three-way valve 100A is comprised of a valve main body 200 and a solenoid valve 250. The valve main body 200 is comprised of a first valve portion 201, a second valve portion 211, a third valve portion 221 and a fourth valve portion 231.

In the first valve portion 201, a first valve body 202 in a spherical form is fitted in a first valve body bore 203 in freely moveable manner. On the hind side of the first valve body 202 is formed a first operation cavity 206. There is disposed a first spring 205 within the first operation cavity 206. This first spring 205 resiliently urges the first valve body 202 downward in the figure. And the first valve body 202 lifts from or rests on a first valve seat 204 during the operation.

The second valve portion 211 is arranged in symmetry to the first valve portion 201. And a second valve body 212 is fitted in a second valve body bore 213 in freely moveable manner. The second valve body 212 is resiliently urged by a second spring 215 which is disposed within a second operation cavity 216. Then the second valve body 212 lifts from or rests on a second valve seat 214 during the operation.

Next, the third valve portion 221 is arranged in parallel to the second valve portion 211. A third valve body 222 is fitted in a third valve body bore 223 in freely moveable manner. On the hind side of the third valve body 222 is formed a third operation cavity 226. The third valve body 222 is resiliently urged by a third spring 225 which is disposed within the third operation cavity 226. Then the third valve body 222 lifts from or rests on a third valve seat 224 during the operation.

In the fourth valve portion 231, a fourth valve body 232 is disposed at the frontal tip of a moveable attraction element 251. On the hind side of the moveable attraction element 251 is formed a fourth operation cavity, and a fourth spring 255 which is disposed within the fourth operation cavity resiliently urges the moveable attraction element 251. Surrounding of this fourth valve body 232 defines a fourth valve body bore 233. And the fourth valve body 232 lifts from or rests on a fourth valve seat 234. The fourth valve body 232 operates with the moveable attraction element 251 in an integral manner. This moveable attraction element 251 is attracted toward the fixed attraction element 252 in accordance with the current supplied to the coil portion. The fourth valve body 232 thus opens/closes the orifice of the fourth valve seat 234.

In this valve main body 200, there is disposed a first fluid inlet port, not shown, which communicates with the first valve body bore 203 and is arranged perpendicular to the cross section in FIG. 6. There is also disposed a second fluid inlet port, not shown, which is arranged perpendicular to the cross section in FIG. 6 as well. Furthermore, the orifice in the periphery of the first valve seat 204 and the orifice in the periphery of the second valve seat 214 are communicated with each other by means of a first inter-valve communication passage 260. There is formed a fluid outlet port 261 in a direction perpendicular to the first inter-valve communication passage 260. There is also disposed a second inter-valve communication passage 263 which is arranged in parallel to the first inter-valve communication passage 260 and communicates the orifice in the periphery of the third valve seat 224 and the orifice in the periphery of the fourth valve seat 234. A pin 227 is disposed within the second inter-valve communication passage 263 in which the respective ends of the pin 227 are connected with the third valve body 222 and the fourth valve body 232, respectively. Further, the first inter-valve communication passage 260 and the second inter-valve communication passage 263 communicate with each other by means of a return passage 262. In addition, interior of the first operation cavity 206 and interior of the fourth valve body bore 233 are communicated with each other by means of a first pilot passage 264. Also interior of the second operation cavity 216 and interior of the third valve body bore 223 are communicated with each other by means of a second pilot passage 265.

In a three-way valve 100A thus configured, when the moveable attraction element 251 is attracted to the fixed attraction element 252 according to the current supplied to the coil in the solenoid coil 250, the orifice of the fourth valve seat 234 opens and the first operation cavity 206, the first pilot passage 264, the return passage 262 and the first inter-valve communication passage 260 are all communicated through. Therefore, if the pressure in the first operation cavity 206 drops, then the first valve body 202 lifts from the first valve seat 204, thereby opening the valve. Under this circumstance, a refrigerant introduced from the aforementioned first fluid inlet port is discharged to the fluid outlet port 261. On the other hand, when the fourth valve body 232 rests on the fourth valve seat 234 for closing valve, the first valve body 202 remains closed, thereby preventing the refrigerant from being discharged to the fluid outlet port 261. When the current to the coil of the solenoid valve 250 is shut off, the moveable attraction element 251 departs from the fixed attraction element 252 downwards in the figure and the pin 227 pushed by the moveable attraction element 251 urges the third valve body 222 so as to lift from the third valve seat 224, thereby opening the valve. In this case, a refrigerant introduced from the second fluid inlet port is discharged to the fluid outlet port 261. On the other hand, when the third valve body 222 rests on the third valve seat 224 for closing valve, the second valve body 212 remains closed, thereby preventing the refrigerant from being discharged to the fluid outlet port 261.

In this three-way valve 100A, the current supplied to the solenoid valve 250 interchangeably opens or closes the orifices of the third valve portion 221 and the fourth valve portion 231, thereby controlling the pressures within the first operation cavity 206 and the second operation cavity 216 and thus the pressures of the operating fluid introduced from the first fluid inlet port and the second fluid inlet port controlling opening/closing of the first valve body 202 and the second valve body 212. Therefore, a problem arises that an actual valve opening/closing speed is delayed from a target speed of the three-way valve 100A. Also as it requires the third valve portion 221 and the fourth valve portion 231 in addition to the first valve portion 201 and the second valve portion 211, the number of parts required increases and the parts cost of the three-way valve 100A also increases. Since the first valve portion 201 and the second valve portion 211 are actuated by the operating fluid which is controlled by the third valve portion 221 and the fourth valve portion 231 according to the solenoid valve 250, narrow passageways such as the first pilot passage 264, the second pilot passage 265, the return passage 262 and the like need to be fabricated in which manufacture of the narrow passageways causes difficulties in machining. This imposes a problem of increasing manufacture cost of the three-way valve.

Patent reference 1: Japanese Patent Laid-Open Publication No. 2004-92779 (FIG. 4 and FIG. 5)

DISCLOSURE OF THE INVENTION

Technical Problems to be Solved by the Invention

The present invention is proposed for alleviating the above mentioned disadvantages, and the technical problem to be solved by the invention is to enhance opening/closing ability of the valve body in responding to an operational force. Another objective is to make it possible to manufacture fluid passages of the operating fluid whether in a large diameter or in a small diameter. Yet another objective is to simplify an operational construction of the valve body of the switching valve for a reliable valve opening/closing, to reduce the number of parts and to decrease manufacture cost thereof.

Means for Solving the Technical Problems

A primary object of the present invention is to solve the above mentioned technical problems, and a solution to such problems is embodied as follows.

A switching valve related to the present invention is a switching valve for switching a valve chamber which communicates with an introduction fluid passage and a discharge fluid passage. The switching valve is comprised of a valve chamber disposing a first valve seat and a second valve seat opposing the first valve seat, a first fluid passage communicating with a first valve orifice defined on the periphery of the first valve seat of the valve chamber for introducing an operating fluid, a second fluid passage communicating with the valve chamber for discharging or introducing the operating fluid, a third fluid passage communicating with a second valve orifice defined on the periphery of the second valve seat of the valve chamber for discharging the operating fluid, a valve body being disposed in the valve chamber and interchangeably lifting from and resting on the first valve seat and the second valve seat, a rod portion being connected with the valve body, a guide bore guiding displacement of the rod portion, a retainer for a seal means being disposed in the circumference of the guide bore, an auxiliary passage communicating with the retainer and the first fluid passage, and a solenoid portion actuating a solenoid rod which is connected with the rod portion, wherein a first pressure-receiving area, which is defined by a surface inside the periphery of contact of the first valve seat and the valve body and receives pressure of the operating fluid, is approximately the same as a third pressure-receiving area of the rod portion which receives pressure of operating fluid within the retainer.

EFFECTS OF THE INVENTION

In the switching valve of the present invention, the first pressure-receiving area of the valve body which is acted on by the first operating fluid introduced from the first fluid passage is arranged to be more or less the same as the third pressure-receiving area of the valve rod in the retainer for a seal means which is acted on by the first operating fluid introduced from the auxiliary passage. Therefore, the force exerted by the first operating fluid urging the valve body to lift from the first valve seat opposes and cancels another force given by the pressure within the retainer urging the valve body to rest on the first valve seat. This enables it to open or close the valve body in accordance with the intensity of the current supplied to the solenoid portion, thereby exhibiting outstanding valve opening/closing response. And besides, since the valve body can achieve opening/closing action without being affected by forces exerted by the operating fluid, a fluid passage cross-section area of the second fluid passage as well as a fluid passage cross-section area of the first fluid passage can be designed to an arbitrary size of cross-section area. Therefore, one can build a switching valve of similar design but larger dimension which is capable of dealing with a large volume of operating fluid. Or likewise possible is a switching valve of similar design but more compact dimension which deals with a small volume of operating fluid. It is also possible to permit the first operating fluid to flow from the first fluid passage to the second fluid passage. Yet it is possible to permit the third operating fluid to flow from the second fluid passage to the third fluid passage. Further yet keeping the position of the valve body in the middle of the valve chamber makes it possible to permit the first operating fluid to flow from the first fluid passage to the third fluid passage. Therefore even a compact switching valve can have a variety of passage arrangement.

DESCRIPTION OF REFERENCE NUMERALS 1 switching valve
2 valve portion 2A valve housing (valve main body)
3 first valve seat
4 second valve seat
5 bearing portion
5A guide bore
5B cavity circumferential wall
5C contact surface
6 first fluid passage
6A first communication passage
7 second fluid passage
7A second communication passage
8 third fluid passage
8A third communication passage
10 valve body
10A first valve face
10B second valve face
11 rod portion
11A outer circumferential surface
14 valve chamber
15 auxiliary passageway
16 introduction passage
17 retainer
20 solenoid portion
21 main body
22 coil portion
23 sleeve
23A inner circumferential surface
24 moveable attraction element
24A outer circumferential surface
25 fixed attraction element
26 solenoid rod
26A outer circumferential sliding surface
30 seal ring (seal means)
30A inner circumferential surface
30B side surface
42 first spring (first spring means)
41 supplementary spring (second spring means)
P1 first operating fluid
P2 second operating fluid
P2A third operating fluid
P3 fourth operating fluid

BEST MODE FOR CARRYING OUT THE INVENTION

Described below is the details of the switching valve based on the figures of a preferred embodiment in accordance with the principles of the present invention. All the figures explained below are constructed according to actual design drawings with accurate dimensional relations.

Figure 1:
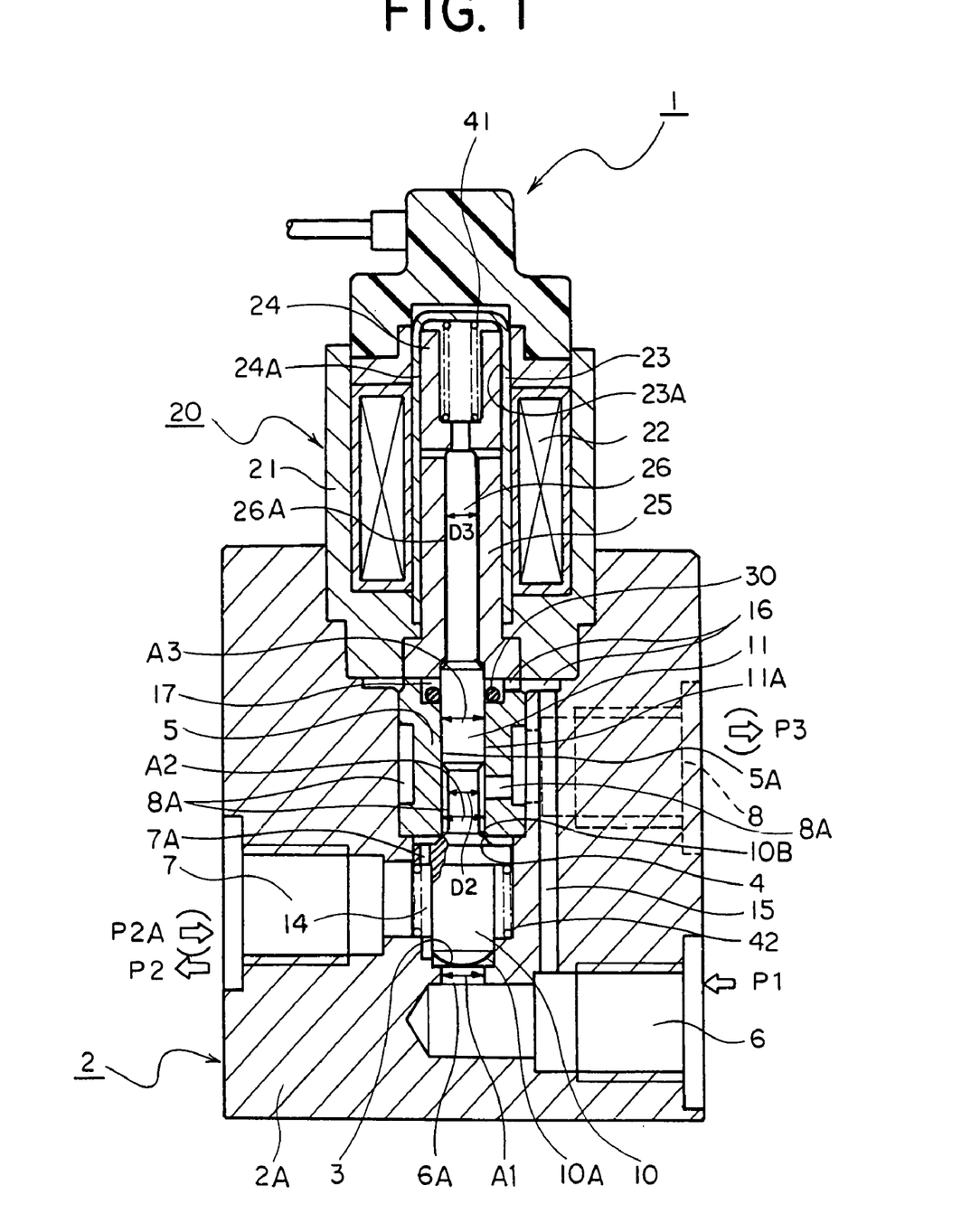
FIG. 1 is a full cross-sectional view of a switching valve as a first embodiment of the present invention.
Figure 2:
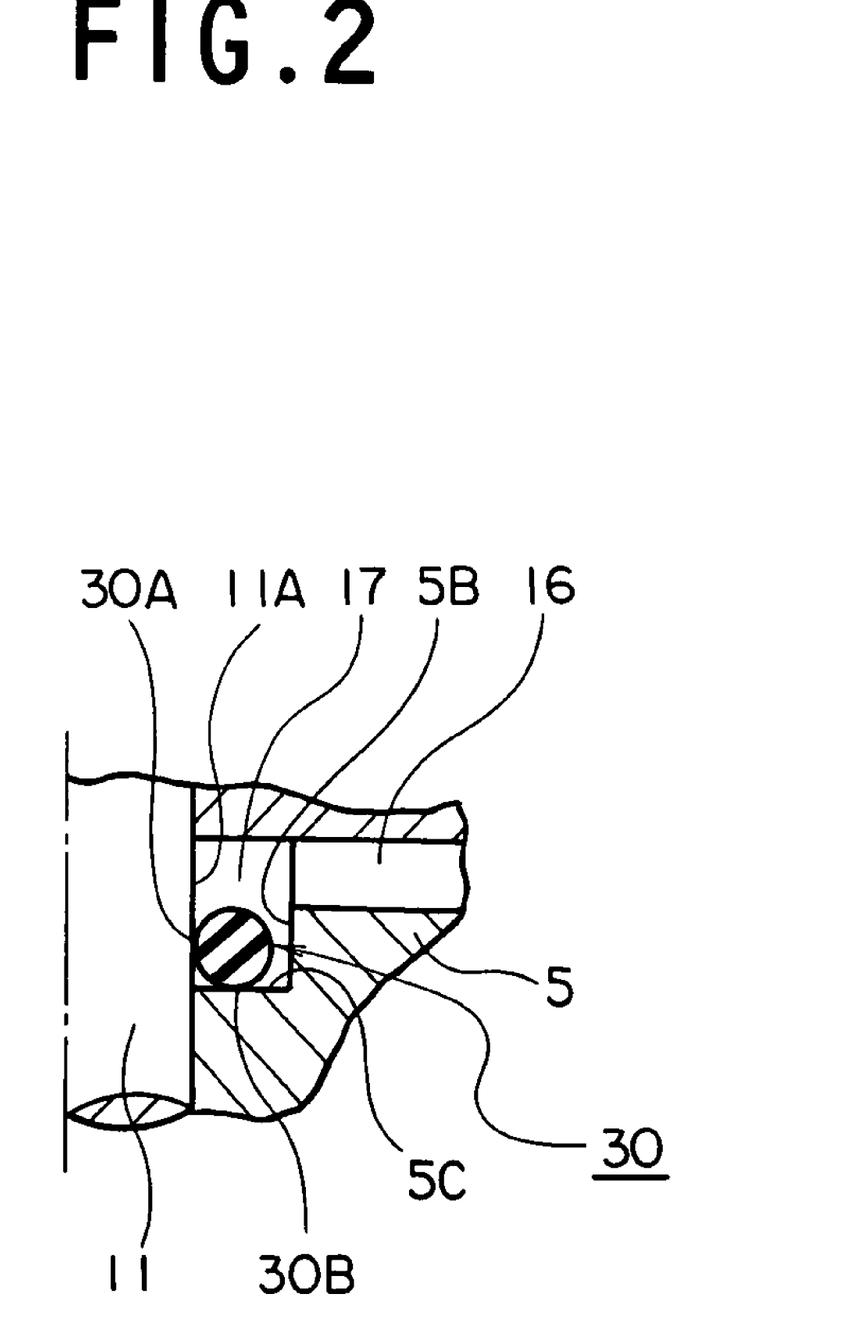
FIG. 2 is an enlarged cross-sectional view of a seal ring retainer and a seal ring disposed in the seal ring retainer shown in FIG. 1.

FIG. 1 is a cross-sectional view of a switching valve as a first embodiment related to the present invention. Also FIG. 2 is a portional cross-section view illustrating the vicinity of a retainer 17 showing a seal means. This switching valve is advantageous for switching operating fluid, for instance, in a refrigeration cycle as illustrated in FIG. 4 or a heating cycle as illustrated in FIG. 5. In FIG. 1 and FIG. 2, a switching valve 1 disposes a valve housing (also referred to as a valve main body) 2A which defines outer form thereof. This valve housing 2A disposes a valve chamber 14 in axial center thereof. There is also disposed a first fluid passage 6 which admits a first operating fluid P1 from outside when viewed from the center of the valve chamber 14. A first communication passage 6A is disposed between the first fluid passage 6 and the valve chamber 14. Rotating the first communication passage 6A along the circumference by about 180 degrees, there is disposed a second fluid passage 7 which communicates with the valve chamber 14. The first operating fluid P1 in the valve chamber 14 is discharged as a second operating fluid P2 (same operating fluid as the first operating fluid P1) to the second fluid passage 7. Also the second operating fluid P2 is introduced from the second fluid passage 7 to the valve chamber 14 as a third operating fluid P2A (operating fluid after the second operating fluid P2 operates at a new destination). Further, rotating from the location of the second fluid passage 7 along the circumference by about 145 degrees, there is disposed a third fluid passage 8 which communicates with the valve chamber 14. A third communication passage 8A then is disposed between the valve chamber 14 and the third fluid passage 8. And the third operating fluid P2A is introduced from the second fluid passage 7 into the valve chamber 14, and is discharged as a fourth operating fluid via third communication passage 8A to the third fluid passage 8. Relative locations of the respective first fluid passage 6, second fluid passage 7 and third fluid passage 8 in the valve housing 2A should not be restricted to the above choice of angles, but should be arranged with appropriate spaces therebetween along the circumference from a viewpoint of easy pipe fitting.

A bearing portion 5 is defined in the through hole which is located in the upper portion in the figure relative to the valve chamber 14 of the valve housing 2A. The axial center of the bearing portion 5 forms a guide bore 5A. This guide bore 5A provides a freely moveable guide to a rod portion 11 which will be described later. This guide bore 5A can be substituted by a bearing using a composite material in which a thin bearing in a sleeve form made of rubber or resin material is fitted in the inner circumferential surface of the bearing portion 5. This bearing not only serves as a guide for the rod portion 11 but also serves as a sealing means. That is, the above mentioned bearing, not shown, not only seals the first operating fluid but also guides the rod portion 11. The valve housing 2A disposes a mount bore of a double-step shoulder form at the upper end of the bearing portion 5 in the figure. This mount bore fittingly receives the lower portion of a solenoid portion 20 in the figure. Also the upper surface of the bearing portion 5 in the figure disposes a plurality of groove notches along circumference thereof. Furthermore, outer circumference of the notches in the bearing portion 5 is arranged to form a cavity between the joint surfaces of the valve housing 2A and the solenoid portion 20. Combined this cavity with the notches defines a introduction passage 16. This introduction passage 16 is communicated via auxiliary passageway 15 with the first fluid passage 6. That is, the auxiliary passageway 15 communicates with the first fluid passage 6 at its one end while the other end communicates via the introduction passage 16 with a retainer 17 for a seal ring (also referred to as sealing means) 30 which will be described later. This auxiliary passageway 15 is defined by an axially extending through hole with respect to the valve housing 2A.

In the valve chamber 14, a first valve orifice is disposed at the opening of the first communication passage 6A which is perpendicular to the axis of the first fluid passage 6. Periphery of the first valve orifice defines a first valve seat 3. A second valve orifice is disposed at the opening of the third communication passage 8A which is opposite the first valve seat 3. Periphery of the second valve orifice defines a second valve seat 4. Furthermore, the valve chamber 14 disposes a valve body 10 therewithin. This valve body 10 disposes a first valve face 10A which lifts from or rests on the first valve seat 3, thereby opening/closing the first valve orifice. The inner surface of the first valve face 10A which forms a sealing contact with the first valve seat 3 defines a first pressure-receiving area "A1". Also the valve body 10 disposes a second valve face 10B which lifts from or rests on the second valve seat 4, thereby opening/closing the second valve orifice. The inner surface of the second valve face 10B which forms a sealing contact with the second valve seat 4 defines a second pressure-receiving area "A2". And the valve body 10 fits the inner circumferential surface of the valve chamber 14 in freely slidable manner wherein the second valve face 10B lifts from the second valve seat 4 when the first valve face 10A comes to rest on the first valve seat 3. On the other hand, the second valve face 10B comes to rest on the second valve seat 4 when the first valve face 10A lifts from the first valve seat 3. This switching valve 1 operates as a three-way valve. That is, up-and-down movement of the valve body 10 interchangeably opens and closes the first valve orifice and the second valve orifice.

Lower portion of the valve chamber 14 sliding relative to the valve body 10 is arranged to form a step shoulder in a small diameter which serves as a passageway communicating the first communication passage 6A with the second fluid passage 7 for permitting the first operating fluid P1 to flow through. The outer circumference of the small diameter portion receives a first spring 42 (also referred to as a first spring means) in a concentric manner. This first spring 42 resiliently urges the valve body 10 toward the second valve seat 4 side. Large diameter portion (upper portion of the valve body 10 in the figure) of the valve body 10 which make a sliding movement relative to the inner circumferential surface disposes a plurality of second communication passages 7A which axially extend therethrough along the circumference. This second communication passage 7A comes to communicate with the third communication passage 8A when the second valve orifice of the second valve seat 4 opens. Also the third communication passage 8A communicates with the third fluid passage 8 and external piping. Furthermore, since the bearing portion 5 as a separate part from the valve housing 2A forms a fit engagement with the through bore of the valve housing 2A, the bearing portion 5 can be produced by machining cupper alloy, sintered alloy or resin material. Annular groove disposed in the outer circumference of the bearing portion 5 serves as a portion of the third communication passage 8A. The annular groove of the bearing portion 5 and the guide bore 5A are communicated through by through holes, which in total define the third communication passage 8A. The through holes are a plurality of bores radially extending from the center of the bearing portion 5 to the interior of the annular groove. Instead of disposing the bearing portion 5, a guide bore 5A can directly be fabricated in the valve housing 2A. Diametral dimension (diameter "A3") of the guide bore 5A disposed in the bearing portion 5 should preferably be the same as the diameter (diameter "A2") of third communication passage 8A disposed in the inner circumference of the bearing portion 5. And the valve housing 2 is manufactured by using metal such as brass, cupper, aluminum, iron and the like or synthetic resin and the like.

In the upper portion of the guide bore 5A in the figure, as mentioned earlier, there is disposed a retainer 17 for installing a seal ring 30 (also referred to as sealing means). FIG. 2 illustrates an enlarged view of the vicinity of this retainer 17. This retainer 17 is arranged to have a recess form within the cavity circumferential wall 5B on the upper surface of the bearing portion 5 in which the diameter of the cavity circumferential wall 5B is larger than the inner diametral dimension of the guide bore 5A (refer to FIG. 2). The retainer 17 for the seal ring 30, as clearly seen from FIG. 2, is defined by the cavity circumferential wall 5B and a contact surface 5C located at the bottom of the recess. The retainer 17 for the seal ring 30 mounts a seal ring 30 being made of rubber material and with "O"-shaped cross section. A side surface 30B of the seal ring 30 when viewed from a radial direction rests on the contact surface 5C. Inner circumferential surface 30A of the seal ring 30 comes to form a light contact with the outer circumferential surface 11A of the rod portion 11.

The rod portion 11 is connected with a solenoid rod 26. A shaft of the rod portion 11 which is connected with the valve body 10 is formed in a small diameter "D2" which is more or less the same as the diameter "D3" of the solenoid rod 26. Also the cross-section "A3" of the rod portion 11 is approximately equal to the cross-section of the guide bore 5A. The diameter of the rod portion 11, however, is arranged to fall within a range of 0.05 mm from the diameter of the guide bore 5A so as to permit a sliding movement under a very small clearance. Furthermore, the seal ring 30 prevents the first operating fluid P1 introduced via introduction passage 16 from leaking into the valve chamber 14 through the fit clearance between the outer circumferential surface 11A and the guide bore 5A. The first operating fluid P1 flows into the clearance gap formed between an outer circumferential sliding surface 26A of the solenoid rod 26 and a guide surface 25A of a fixed attraction element 25. Then the first operating fluid P1 acts on the rod portion 11. Two opposing forces are balanced; a force pointing downward due to the first operating fluid P1 acting on the cross-section area "A3" of the rod portion 11 and a force pointing upward due to the first operating fluid P1 acting on the first pressure-receiving area "A1" of the valve body 10. The cross-section area "A3" of the rod portion 11 and the first pressure-receiving area "A1", by which the first valve face 10A of the valve body 10 forms a contact with the first valve seat 3, are arranged in approximately an equal area. In this case, the cavity circumferential wall 5B of the retainer 17 for the seal ring 30 should be arranged large enough so that the outer circumferential surface of the seal ring 30 does not make contact with the cavity circumferential wall 5B even after the first operating fluid P1 causes the seal ring 30 undergo elastic deformation. Therefore, since the outer circumferential surface of the seal ring 30 is not squeezed against the cavity circumferential wall 5B even though the seal ring 30 is compressed in axial direction and is flattened and stretched radially outward, the outer circumferential surface side of the seal ring 30 can freely stretch and thus inner circumferential surface 30A thereof can prevent from being heavily squeezed against the outer circumferential surface 11A of the rod portion 11. As the result, when the opening/closing action of the valve body 10 creates up-and-down movement of the rod portion 11 according to the figure, frictional resistance against the seal ring 30 is reduced.

The mount bore disposed in the upper end portion of the valve housing 2A in the figure fittingly engages the end portion of the main body 21 of the solenoid portion 21. This main body 21 disposes a sleeve 23 which has a bottomed cylindrical form and shares the same axis as the main body 21. A coil portion 22 is installed onto the outer circumference of the sleeve 23. The outer circumference of the coil portion 22 fittingly engages with the inner circumferential surface such that the main body 21 and the fixed attraction element 25 form a magnetic circuit therethrough. One distal end portion of the inner circumferential surface 23A of the sleeve 23 fits the outer circumferential surface 24A of the moveable attraction element 24 in freely moveable manner. The other end portion of the inner circumferential surface 23A of the sleeve 23 is securely sandwiched between the fixed attraction element 25 and the main body 21 under the assembled state. And the moveable attraction element 24 is connected with one end portion of the solenoid rod 26. In addition, the other end surface of the solenoid rod 26 is kept in contact with the end face of the rod portion 11. The outer circumferential sliding surface 26A of the solenoid rod 26 fits the guide surface of the fixed attraction element 25 in freely slidable manner. When an electric current is supplied to the coil portion 22 via electric wires connected to the top portion of the solenoid portion 20 in the figure, the moveable attraction element 24 is attracted to the fixed attraction element 25 in accordance with the intensity of the current supplied. When the current is shut off the moveable attraction element 24 is resiliently urged by the first spring 42, thereby lifting from the fixed attraction element 25. Therefore, the moveable attraction element 24 forces the valve body 10 connected with the solenoid rod 26 to move according to the intensity of the current supplied to the solenoid portion 20, thereby interchangeably lifting from or resting on the first valve seat 3 and the second valve seat 4, thereby interchangeably opening or closing the first valve orifice and the second valve orifice. The moveable attraction element 24 is resiliently urged toward the valve body 10 side by means of an auxiliary spring 41 (also referred to as a second spring means).

According to the switching valve 1 configured as described above, the valve portion 10 is acted by F1 so as to open the valve when no electric current is supplied to the solenoid portion 20. The F1 is given by the following equation.

$$F1=P1*A1-P1*A3+K1-K2.$$

Therefore, A1=A3 leads to F1=K1−K2.
where
"A1" is a first pressure-receiving area.
"P1" is a pressure of the first operating fluid introduced via first fluid passage 6.
"A3" is a cross-section area of the rod portion 11.
"K1" is a force given by the first spring 42.
"K2" is a force given by the auxiliary spring 41.
When a current is supplied to the solenoid portion 20, then the valve portion 10 is acted by F2 so as to close the valve. The F2 is given by the following equation.

$$F2=P1*A1-P1*A3+K1-K2+S.$$

Since A1=A3, F2=K1−K2+S
where "S" is an attraction force due to the solenoid portion 20. Therefore, the valve body 10 is able to operate without regard for the force applied by the operating fluid.

Figure 3:
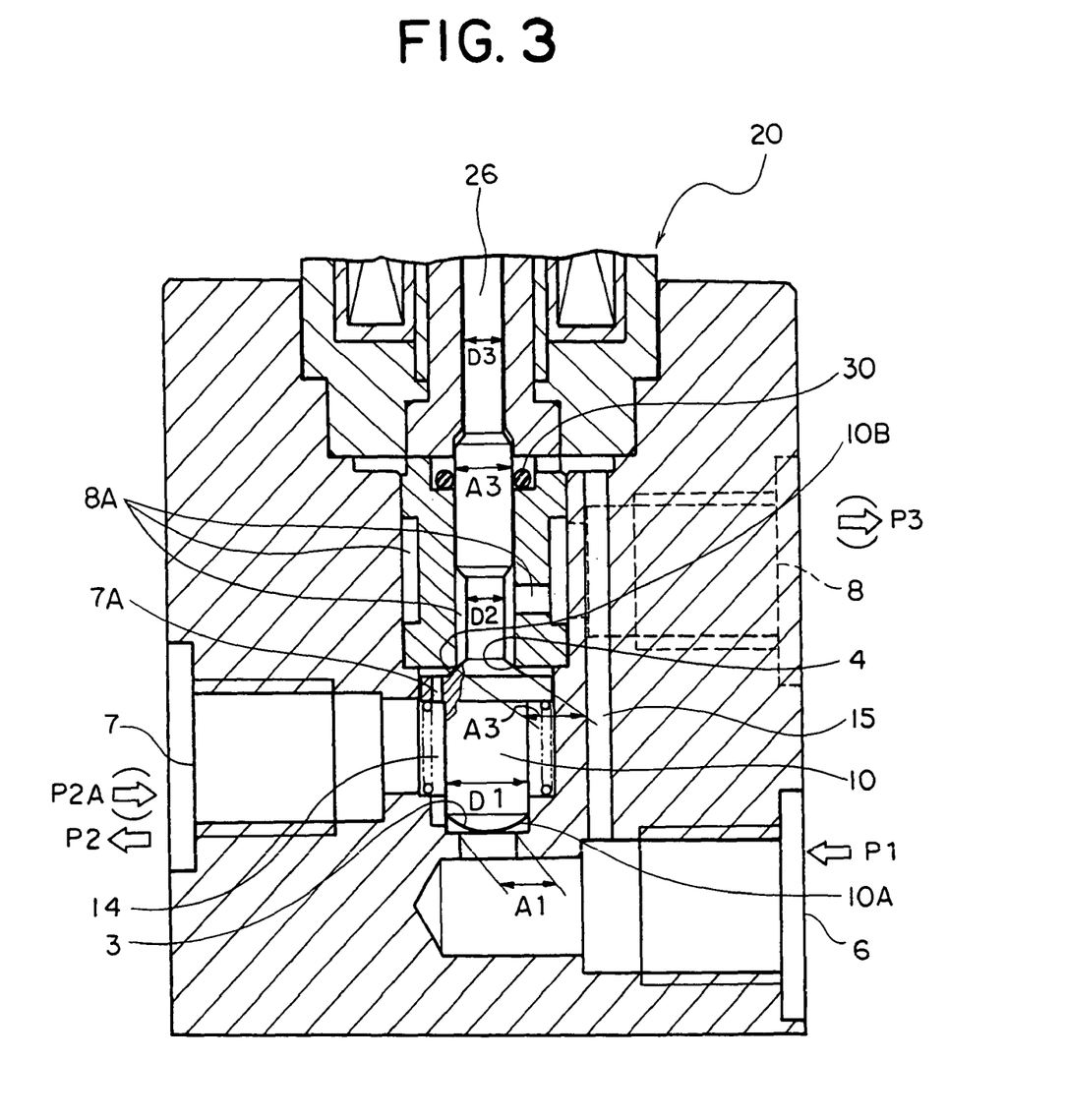
FIG. 3 is a cross-sectional view of a portion of a switching valve as a second embodiment of the present invention.

FIG. 3 shows an enlarged view of a portion of the switching valve 1 as a second embodiment related to the present invention. Overall construction of the switching valve 1 in FIG. 3 is more or less the same as that in FIG. 1. What makes FIG. 3 different from FIG. 1 is that a second pressure-receiving area "A2" which is defined by the inner surface where the second valve face 10B of the valve body 10 and the second valve seat 4 make contact, a cross-sectional area "A3" of the valve rod and the first pressure-receiving area "A1" all have approximately the same area size. That is, the first pressure-receiving area "A1" where the first valve face 10A of the valve body 10 and the first valve seat 3 make contact, the second pressure-receiving area "A2" (this is referred to as "A3" in FIG. 3 though it is referred to as "A2" in the following equations) of the inner surface where the second valve face 10B of the valve body 10 and the second valve seat 4 make contact, and the cross-sectional area "A3" of the valve rod are all arranged to be of more or less an equal area size. Other constructions in FIG. 3 are almost the same as FIG. 1.

According to the switching valve 1 configured as described above, the valve portion 10 is acted by F1 so as to open the valve when no electric current is supplied to the solenoid portion 20. The F1 is given by the following equation.

$$F1=P1*A1-P1*A3+K1-K2.$$

Therefore, A1=A3 leads to F1=K1−K2. Namely, this term is identical with that of the first embodiment.
Where
"A1" is a first pressure-receiving area.
"P1" is a pressure of the first operating fluid introduced via first fluid passage 6.
"A3" is a cross-section area of the rod portion 11.
"K1" is a force given by the first spring 42.
"K2" is a force given by the auxiliary spring 41.
When a current is supplied to the solenoid portion 20, then the valve portion 10 is acted by F2 so as to close the valve. The F2 is given by the following equation.

$$F2=P1*A1-P1*A2(=A3)+P3*A2(=A3)-P3*A3+K1-K2+S.$$

Since A1=A2=A3 and PA2=P3, F2=K1−K2+S
where "S" is an attraction force due to the solenoid portion 20. Therefore, the valve body 10 is able to operate without regard for the force applied by the operating fluid.

In the switching valve 1 thus constructed, the valve body 10 is actuated by joining the valve body 10 with the rod portion 11 and making the solenoid rod 26 in contact with the rod portion 11. If the first operating fluid P1 is assumed to act on the valve body 10 during the opening/closing action of the valve body 10, then the valve body 10 is urged toward the direction of the solenoid portion 20. When an unbalanced operating force of the first operating fluid P1 is acting on the valve body 10, accuracy of an operating force exerted in accordance with the intensity of the current supplied to the solenoid portion 20 may be reduced. It may also affect forces given by the first spring 42 and the auxiliary spring 41 carefully designed. In the present invention, unbalanced operating force of the first operating fluid P1 acting on the valve body 10 deteriorates the accuracy of an operating force operated in accordance with the intensity of the current supplied to the solenoid portion 20. At the same time, configuration of the retainer 17 and the seal ring 30 not only prevents the first operating fluid P1 from leaking through the fit clearance gap between the rod portion 11 and the guide bore 5A, but also reduces frictional resistance of the seal ring 30 relative to the rod portion 11. As a consequence, the opening/closing action of the valve body 10 is determined by an attraction force of the solenoid portion 20 and respective spring forces of the first spring 42 and the auxiliary spring 41. Therefore, it can be expected that opening/closing of the valve body 10 is not affected by an unwanted pressure of the operating fluid and operates as specified according to the operational forces of the solenoid portion 20 and respective springs 41, 42. More particularly, it is advantageous that an attraction force of the solenoid portion 20 can actuate the valve body 10 in proportion with the magnitude (intensity) of the current supplied to the coil portion 22 because frictional resistance of the valve portion 11 during operation as well as unwanted pressure disturbance acted on the valve body 10 by the operating fluid during opening/closing of the valve body 10 are decreased.

Construction and operational effect of other embodiments related to the present invention will be described below.

In a switching valve of the first invention relative to the present invention, the first pressure-receiving area of the valve body and the third pressure-receiving area of the rod portion are arranged to be more or less the same as the second pressure-receiving area which receives pressure of the third operating fluid and is defined on a surface inside the periphery where the second valve seat and the second valve face of the valve body come in contact.

According to the switching valve of the first invention, the first pressure-receiving area which receives pressure of the first operating fluid as the result of the valve body being in contact with the first valve seat and the third pressure-receiving area of the valve rod contained in the retainer are configured to be more or less the same as the second pressure-receiving area which receives pressure of the third operating fluid as the result of the valve body being in contact with the second valve seat. Therefore, the axial forces due to the operating fluid acted on the third pressure-receiving area of the valve rod and the first pressure-receiving area of the valve body oppose and cancel with each other. Forces acted by the operating fluid on the second pressure-receiving area in axially upward and downward directions also oppose and cancel with each other. That is, all the forces acted by the operating fluid on the valve body and the rod portion oppose with each other and make a balance along the axial direction. The valve body therefore can be actuated solely by means of the operating force of the solenoid portion or forces given by spring means. As the result, outstanding opening/closing response of the valve body in accordance with a given operating force is achieved.

In a switching valve of the second invention relative to the present invention, there are disposed a first spring means urging the valve body to lift from the first valve seat so as to oppose the attraction force of the solenoid portion urging the valve body to rest on the first valve seat and a second spring means opposing the first spring means.

According to the switching valve of the second invention, if a valve body is actuated by an operational force of the solenoid portion alone, then an external force may cause vibration of the valve body when the operational force is small. However, making the first spring means and the second spring means oppose to each other in the valve body and valve rod is effective in preventing vibration or swinging motion of the valve body. Therefore, an installation to an air conditioner or vibrating apparatus in vehicles and the like becomes possible.

In a switching valve of the third invention relative to the present invention, outer diameter of the rod portion in which a valve body is connected therewith is arranged to have more or less the same dimension as outer diameter of the solenoid rod.

According to the switching valve of the third invention, diameter of the portion of valve rod which is connected with a valve body is arranged smaller than the inner diameter of the guide bore for the valve rod, and a second valve orifice is disposed at the interface between the third fluid passage and valve chamber. Therefore the second fluid passage and the third fluid passage are able to communicate with each other via valve body. And the guide bore fitting the rod portion to provide a guide can be substituted by a bearing portion which is made of a material suitable for bearing. Thus sticking or abrasion of the bearing portion and rod portion is prevented and the valve main body can be produced by using inexpensive material. At the same time, machining of the third fluid passage is made straightforward, and a communication passage disposed in the outer circumferential side of the rod portion allows the second fluid passage and the third fluid passage to communicate with each other. And besides, the first valve seat and the second valve seat can be arranged in an opposing relation via valve body.

In a switching valve of the fourth invention relative to the present invention, a seal means disposed in the retainer effects a seal without being squeezed against the rod portion.

According to the switching valve of the fourth invention, a seal means disposed in the retainer is arranged not to form a press-contact against the valve rod by pressure of the operating fluid. Therefore frictional resistance against the movement of the rod portion is reduced and even a small current supplied to the solenoid portion is able to achieve a smooth valve opening/closing in accordance with the intensity of current. Thus opening/closing response of the valve body is enhanced.

INDUSTRIAL APPLICABILITY

As described above, a switching valve of the present invention is used as a switching valve in a fluid circuit for pneumatic machinery, compressor and the like, and is advantageous for its enhanced response in valve opening/closing and low-cost product. In particular, it is advantageous in that a valve body is configured to operate so as not to receive unbalanced pressure from the operating fluid and exhibits outstanding response ability. It is also advantageous as a switching valve of large or small size with a low production cost, since the fluid passage can be fabricated in an arbitrary size.

The invention claimed is:

1. A switching valve for switching a valve chamber which communicates with an introduction fluid passage and a discharge fluid passage, said switching valve comprising:
   a) a valve chamber disposing a first valve seat and a second valve seat opposing said first valve seat;
   b) a first fluid passage communicating with a first valve orifice defined on the periphery of said first valve seat of said valve chamber for introducing an operating fluid;
   c) a second fluid passage communicating with said valve chamber for discharging or introducing said operating fluid;
   d) a third fluid passage communicating with a second valve orifice defined on the periphery of said second valve seat of said valve chamber for discharging said operating fluid from said valve chamber;
   e) a valve body being disposed in said valve chamber and interchangeably lifting from and resting on said first valve seat and said second valve seat;
   f) a rod portion being connected with said valve body;
   g) a bearing portion with a guide bore guiding displacement of said rod portion;
   h) a recessed retainer recessed in the circumference of said guide bore on the upper surface of the bearing portion, wherein the recessed retainer has a cavity circumferential wall and a cavity bottom surface;
   i) a seal means disposed in the recessed retainer, wherein a side surface of the seal means contacts said cavity bottom surface of the recessed retainer and an inner circumferential surface of the seal means forms a light contact with an outer circumferential surface of the rod portion such that the seal means forms a seal between said valve chamber and said retainer, and wherein a separation is formed between an outer surface of the seal means and the cavity circumferential wall;
   j) an auxiliary passage communicating with said retainer and said first fluid passage; and
   k) a solenoid portion actuating a solenoid rod which is connected with said rod portion, wherein
   a first pressure-receiving area, which is defined by a surface inside the periphery of contact of said first valve seat and said valve body and receives pressure of the operating fluid from the first fluid passage, is approximately the same as a third pressure-receiving area of said rod portion which receives pressure of the operating fluid from said first fluid passage within said retainer.

2. A switching valve as claimed in claim 1, wherein said first pressure-receiving area of said valve body and said third pressure-receiving area of said rod portion have approximately the same size as a second pressure-receiving area, and is defined by an inner surface encircled by the contact perimeter of said second valve seat and a second valve face of said valve body.

3. A switching valve as claimed in claim 1, further comprising:
   a first spring means; and
   a second spring means, wherein said first spring means urges said valve body to lift from said first valve seat by opposing the attraction force due to said solenoid portion which urges said valve body to rest on said first valve seat, and wherein said second spring opposes said first spring means.

4. A switching valve as claimed in claim 2, further comprising:
   a first spring means; and
   a second spring means, wherein said first spring means urges said valve body to lift from said first valve seat by opposing the attraction force due to said solenoid portion which urges said valve body to rest on said first valve seat, and wherein said second spring opposes said first spring means.

5. A switching valve as claimed in claim 1, wherein an outer diameter of said rod portion which is connected with said valve body is arranged to be more or less the same as an outer diameter of said solenoid rod.

6. A switching valve as claimed in claim 2, wherein an outer diameter of said rod portion which is connected with said valve body is arranged to be more or less the same as an outer diameter of said solenoid rod.

7. A switching valve as claimed in claim 3, wherein an outer diameter of said rod portion which is connected with said valve body is arranged to be more or less the same as an outer diameter of said solenoid rod.

8. A switching valve as claimed in claim 4, wherein an outer diameter of said rod portion which is connected with said valve body is arranged to be more or less the same as an outer diameter of said solenoid rod.

9. A switching valve as claimed in claim 1, wherein said cavity circumferential wall of the retainer is configured such that said outer surface of the seal means does not make contact with the cavity circumferential wall even when the operating fluid causes the seal ring to undergo elastic deformation.

10. A switching valve as claimed in claim 1, further comprising:
   a valve housing in which said first fluid passage, said second fluid passage, and said third fluid passage are formed, wherein said valve housing includes an opening for receiving said bearing portion, and wherein said bearing portion is detachable from said valve housing.

* * * * *